(12) United States Patent
Belew et al.

(10) Patent No.: US 6,515,480 B1
(45) Date of Patent: Feb. 4, 2003

(54) CASING/PUSH BORE MONITOR TECHNIQUE

(75) Inventors: Michael Shane Belew, Columbus, OH (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 1 day.

(21) Appl. No.: 09/944,031

(22) Filed: Aug. 31, 2001

(51) Int. Cl.[7] .............................. G01V 3/08; G01V 3/10
(52) U.S. Cl. ......................................... 324/326; 175/40
(58) Field of Search .................................. 324/334, 332, 324/326, 327, 329; 175/40, 45

(56) References Cited

U.S. PATENT DOCUMENTS 5,644,237 A  7/1997  Eslambolchi et al.

*Primary Examiner*—Walter E. Snow

(57) ABSTRACT

The location of a casing (10) as it is pushed through the earth during installation is monitored by transmitting a locating signal into a water reservoir (24) that supplies water into an auxiliary water pipe (18) that runs substantially the length of the casing for the purpose of monitoring the level of the casing. The water carries the signal into the pipe so that the signal radiates above the ground along the length of the casing. By detecting the signal via a cable locator (30), the location of the casing can be monitored during installation.

8 Claims, 1 Drawing Sheet

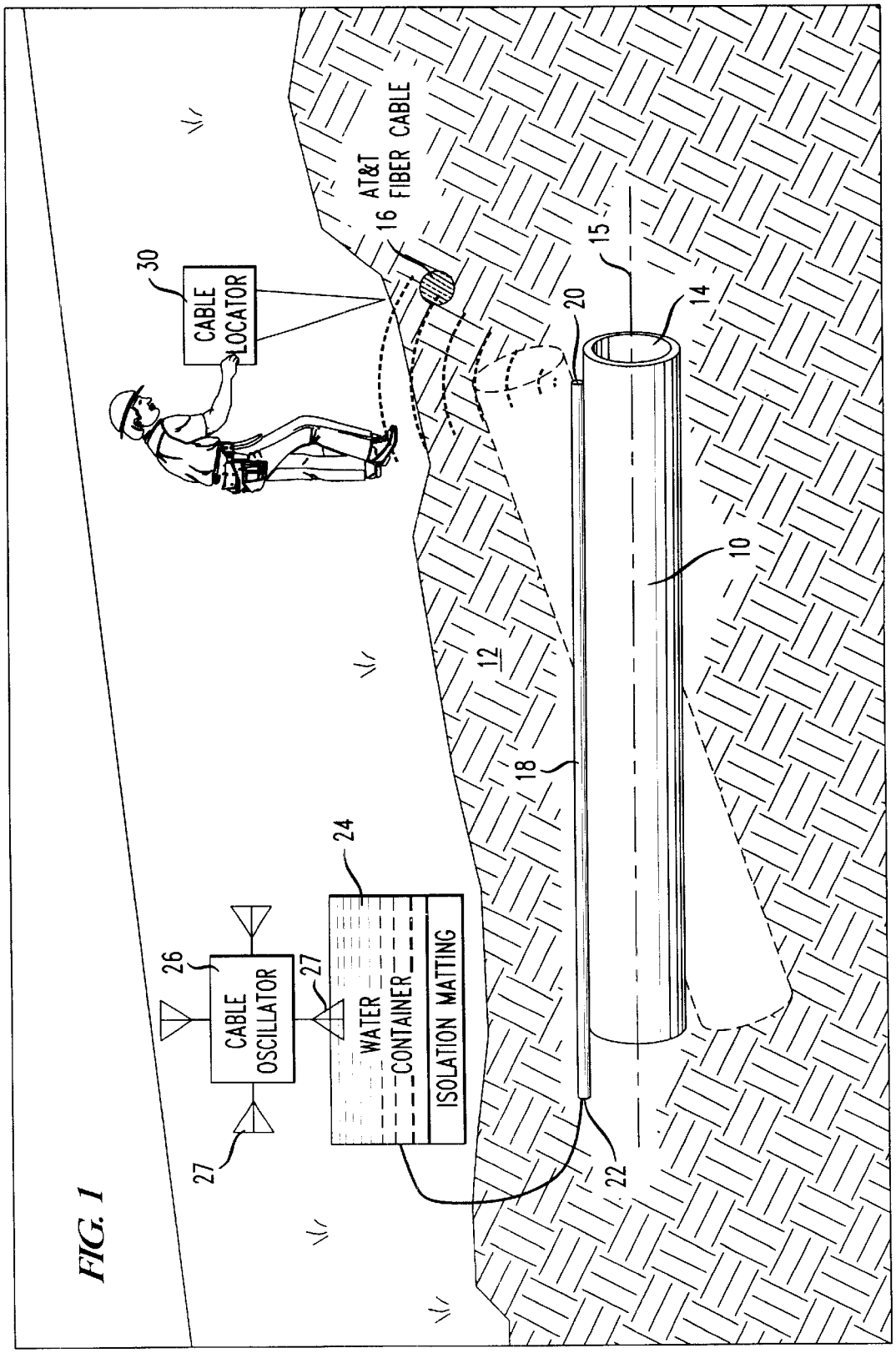

CASING/PUSH BORE MONITOR TECHNIQUE

TECHNICAL FIELD

This invention relates to a technique for locating a non-conductive casing, such as a concrete or clay sewer pipe, as the casing is pushed through the earth during installation.

BACK GROUND ART

Utilities, such as those providing electric, gas, water, and/or telephone service, often bury their conveyances (i.e., pipes and/or cables) underground for reasons of safety and aesthetics. In urban environments, excavation often occurs in close proximity to such buried conveyances. In the past, excavation occurring in close proximity with buried fiber optic communications cables has led to cable cuts that result in extensive service outage. A greater risk occurs when excavating in close proximity to buried pipelines carrying natural gas or gasoline. Inadvertent damage to such buried pipelines can lead to fire and/or explosion, Techniques currently exist for locating buried underground conveyances by impressing a radio frequency locating signal on the conveyance and then monitoring the locating signal radiated above the ground by the conveyance as taught in U.S. Pat. No. 5,644,237, issued in the names of Hossein Eslambolchi and John Huffman, on Jul. 1, 1997, and assigned to AT&T. Now-allowed U.S. patent application Ser. No. 09/503,384, filed in the names of Hossein Eslambolchi and John Huffman, on Jul. 1, 1997, and assigned to AT&T, describes a technique for monitoring a boring head performing a boring operation underground in proximity to one or more buried utility conveyances. The technique described in the aforementioned '384 application relies on monitoring a radio frequency signal radiated above the ground from the boring head to determine the location of the boring head relative to nearby underground conveyances.

A problem related to monitoring the boring head during a boring operation is the problem of monitoring the location of a large water or sewer pipe during installation underground. Often, because of the inability to excavate an open trench, a contractor will install such large pipes, hereinafter referred to as "casings," by pushing the casing through the earth, much like pushing a boring head during a boring operation. Unfortunately, the boring head monitoring technique described in the now-allowed '384 application cannot be readily employed to monitor the installation of casings made from clay or concrete since neither material can carry a locating signal in contrast to the metallic bore head. Consequently, there currently exist no other techniques for monitoring the location of a concrete or clay casing during installation. This often poses a problem because the forward of the casing may wander off the casing centerline by as much as 10% of the casing length when the forward end is pushed through the earth. Thus, for example, the forward end of a 50 foot long casing can wander as much as five feet off the casing centerline during installation.

Thus, a need exists for a technique for monitoring the position of a non-conductive casing, such as a water or sewer pipe made from concrete or clay, during installation.

BRIEF SUMMARY OF THE INVENTION

Briefly, in accordance with a preferred embodiment, there is provided a technique for monitoring the location of a non-electrically conductive casing as it is pushed through the earth. In accordance with the method, a water pipe is attached to the casing to run the length thereof. The pipe member has a closed first end and a second end attached to a reservoir of water or another electrically conductive liquid whose level varies in accordance with the horizontal orientation of the casing. A locating signal transmitter transmits a radio frequency locating signal into the water carried by the pipe so that the water radiates the locating signal above the ground. Using a signal-monitoring device to detect the locating signal radiated above the ground, a contractor can monitor of the location of the casing during installation.

BRIEF DESCRIPTION OF THE DRAWING

FIG. 1 shows a block schematic diagram of system for practicing the technique of the invention for monitoring the location of a non-conductive casing as it is pushed through the earth during installation.

DETAIL DESCRIPTION

FIG. 1 depicts a schematic view of a casing 10, typically a water or sewer pipe, made from an electrically non-conductive material such as clay or concrete. In practice, a contractor installs the casing 10 underground by pushing the casing through the earth 12 via a motor-driven machine (not shown). (The term "contractor" refers to the entity undertaking casing installation, whether that be a water or sewer authority, or a private firm undertaking such installation on behalf of such authority.) As the casing 10 is pushed into the earth, the forward end 14 of the casing may wander off its centerline 15 by as much as 10% of the casing length, as depicted by the dashed lines. Thus, while the casing 10 may be initially positioned such that the forward end 14 is sufficiently spaced from a nearby underground conveyance 16 to avoid any potential interference, the forward end 14 of the casing could potentially wander during installation and strike the conveyance 16 causing damage thereto.

Traditionally, no ability existed to monitor the location of the casing 10 during installation because the electrically non-conductive structure of the casing did not permit it to carry an electromagnetic locating signal. In accordance with the present principles, a technique is provided for locating the casing 10 during installation to avoid potential damage to nearby underground conveyances, such as conveyance 16. The technique of the invention makes use of a pipe 18 or the like, that is typically affixed to the casing 10 to run substantially the length thereof for the purpose of detecting the level of the casing during installation. The pipe 18 has a closed forward end 20 proximate the forward end 14 of the casing 10. The end 22 of the pipe 18 opposite the forward end 20 has a fluid connection to a container 24 that contains a volume of water or another electrically conductive liquid. As the horizontal orientation of the casing 10 varies during installation, the level of the water in the container 24 will vary from a quiescent level associated with a generally horizontal orientation of the casing.

In accordance with the present principles, a cable oscillator 26 that radiates a radio-frequency locating signal via one or more antennas 27, is placed in the fluid container 24. Upon placement of the cable oscillator 26 in the container 24, the locating signal radiated from the antenna(s) 27 passes into the water carried via pipe 18 along the length of the casing so that the locating signal will radiate from substantially the entire length of the casing and pass through the earth 12 above ground. To monitor the locating signal, the contractor typically uses a cable locator 30 commonly available for detecting locating signals radiated by underground conveyances. Such cable locators are available from Radiodetection, Inc. of Mahwah, N.J. By monitoring the locating signal radiated from the casing 10, the contractor installing the casing can determine its location and thus avoid potential damage to nearby buried conveyances, such as conveyance 16.

In practice, the frequency of the locating signal will correspond to the entity installing the casing 10. Typically, the chosen frequency will differ sufficiently from the locating signals on nearby buried conveyances, such as conveyance 16, to avoid interference.

The advantage of the present technique for monitoring the location of the casing 10 is that most casing installations use a water level (e.g., the combination of pipe 18 and container 24) to monitor the casing orientation. To monitor the location of the casing 10 in accordance with the present method, all that needs to occur is to place the cable oscillator 26 in the water container 24.

The above-described embodiments merely illustrate the principles of the invention. Those skilled in the art may make various modifications and changes that will embody the principles of the invention and fall within the spirit and scope thereof.

What is claimed is:

1. A method for monitoring location of an electrically non-conductive casing as the casing is pushed through the earth during installation by a contractor, comprising the steps of:

placing an oscillator in a water reservoir that feeds water into a pipe that runs the length of the casing so that oscillator transmits a locating signal into the water carried by the pipe causing the locating signal to radiate above the earth substantially along the casing; and monitoring the locating signal to locate the casing as it is pushed through the earth.

2. The method according to claim 1 wherein the frequency of the locating signal generated by the oscillator is assigned to contractor undertaking such installation.

3. The method according to claim 2 wherein the frequency of the locating signal differs from a locating signal on an adjacent buried conveyance to avoid interference therebetween.

4. The method according to claim 1 wherein the water level in the reservoir is monitored to monitor orientation of the casing.

5. A method for monitoring location of an electrically non-conductive casing as the casing is pushed through the earth during installation by a contractor, comprising the steps of:

attaching a fluid-carrying pipe to the casing so as to run substantially the length thereof;

feeding water from a water reservoir into the pipe so that the water runs along the pipe substantially the length of the casing;

placing an oscillator in the water reservoir for generating a locating signal carried by the water in the pipe so as to radiate from the pipe above the earth; and monitoring the locating signal above ground to locate the casing as it is pushed through the earth.

6. The method according to claim 5 wherein the frequency of the locating signal generated by the oscillator is assigned to contractor undertaking such installation.

7. The method according to claim 6 wherein the frequency of the locating signal differs from a locating signal on an adjacent buried conveyance to avoid interference therebetween.

8. The method according to claim 5 wherein the water level in the reservoir is monitored to monitor orientation of the casing.

* * * * *